April 6, 1954 A. M. GOODLOE 2,674,644

SHIELDING AND SEALING GASKET FOR ELECTRONIC EQUIPMENT

Filed Jan. 22, 1952 2 Sheets-Sheet 1

INVENTOR.
Alfred M. Goodloe,
BY George D. Richards
Attorney

April 6, 1954 A. M. GOODLOE 2,674,644

SHIELDING AND SEALING GASKET FOR ELECTRONIC EQUIPMENT

Filed Jan. 22, 1952 2 Sheets-Sheet 2

INVENTOR.
Alfred M. Goodloe,
BY George D. Richards
Attorney

Patented Apr. 6, 1954

2,674,644

UNITED STATES PATENT OFFICE 2,674,644

SHIELDING AND SEALING GASKET FOR ELECTRONIC EQUIPMENT

Alfred M. Goodloe, Upper Montclair, N. J., assignor to Metal Textile Corporation, Roselle, N. J., a corporation of Delaware Application January 22, 1952, Serial No. 267,645

8 Claims. (Cl. 174—35)

This invention relates to improvements in shielding and sealing gaskets and the like for use in electronic and other electrical equipment.

All metal high frequency shielding gaskets or the like formed from knitted or woven wire mesh, which provide a bridging or continuous metallic contact between abutted members of metallic shielding enclosure members within which electronic apparatus can be housed, are known to the art, but such all metal shielding gaskets are not adapted to provide a seal against moisture, dust, etc. Attempts have been made to impregnate knitted or woven wire shielding gasket structures with a sealing substance, such as natural or synthetic rubber, or other plastic having resilient characteristics, but such sealing substances so coated the metallic strands of the gasket structure, or was so interposed between said strands, as to interrupt continuity of bridging metallic material between abutted shielding enclosure members, so that the shielding effect of the gasket was lost.

Having the above in view, it is an object of this invention to provide a novel construction of shielding gasket which will not only provide necessary bridging metallic contact between members of a shielding enclosure for electronic apparatus when interposed therebetween, and thus assure the integrity of the shielding enclosure, but will also provide a resiliently compressible sealing body effective to exclude water, dust, etc. from access to the interior of the shielding enclosure, without interfering with or impairing the high frequency shielding effect of the gasket. To this end, the shielding and sealing gasket according to this invention is produced from tubular or flat knit metallic wire mesh, of suitable wire gauge and suitable loop size, through which mesh is pressed a thin sheet of uncured natural or synthetic rubber, or other resilient plastic, by means of a rubber mill or like apparatus, so that the mesh openings are filled with the rubber or like resilient substance. A suitable number of such rubber filled knitted metallic mesh layers are superposed to provide a body thickness equivalent to the desired radial width of gasket to be produced, and then the assembled layers are consolidated by vulcanization into a unitary body. From the body thus produced are cut away gasket bodies of desired thickness; the cut being made lengthwise of the mesh so as to pass axially through successive mesh loops, whereby looped wire strands will extend uninterruptedly across the thickness of the gasket body from one face thereof to the other, the opposite cut ends of said wire strands being exposed respectively at the opposite face surfaces of the gasket body, subject to respectively contact opposed faces of abutted members of a shielding enclosure between which the gasket body is interposed, and thus to provide continuous bridging metallic contact between said abutted members, while at the same time the rubber mass of the gasket body can be compressed between said abutted members for sealing effect; the transversely extending and bridging looped wire formations of the mesh being adapted to yield to the compression without risk of breakage or loss of contact with said abutted members, and consequently so that the shielding effect thereof is constantly maintained.

The above and other objects of this invention will be understood from a reading of the following detailed description thereof in connection with the accompanying drawings, in which.

Similar characters of reference are employed in the above described views, to indicate corresponding parts.

Figure 1:
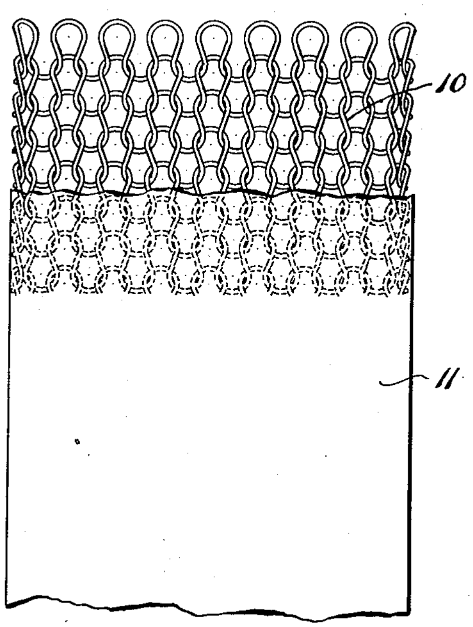
Fig. 1 is a face view, with parts broken away, of a rubber filled layer or sheet of flattened tubular knit metallic wire mesh, which is a base material from which gasket bodies according to this invention are produced.
Figure 2:
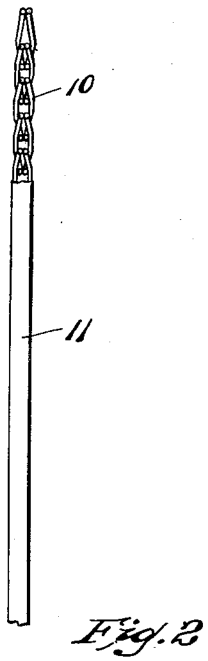
Fig. 2 is an edge elevational view of the same.

The shielding and sealing gasket of this invention is produced from base material of the kind shown in Figs. 1 and 2. This base material comprises knitted wire mesh 10, which may be either of the tubular knit type or of the flat knit type. A tubular knit length of wire mesh 10, of suitable wire gauge and suitable loop size, is flattened to provide a two ply mesh sheet, or is split to provide a single ply mesh sheet, or a single ply mesh sheet may be provided by flat knit wire. In any case, a thin layer or sheet of uncured natural or synthetic rubber or other suitable resilient plastic 11 is overlaid upon the mesh sheet, and, by suitably applied pressure, is forced into the openings or interstices of the latter so as to provide a composite imperforate sheet comprising the intimately united rubber or other plastic and knitted wire mesh.

Figure 3:
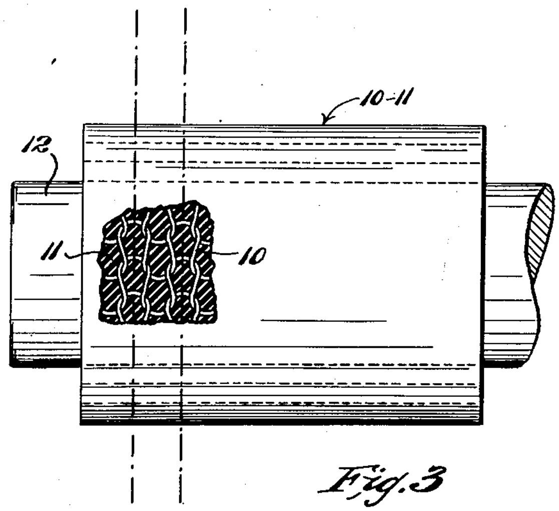
Fig. 3 is a side elevational view, in part section, showing the base material wound around a mandrel subject to consolidation by vulcanization into a unitary body.
Figure 4:
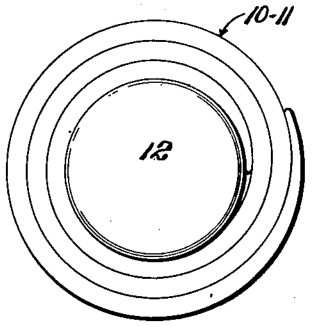
Fig. 4 is an end elevation of the same, viewed from the left in Fig. 3.
Figure 5:
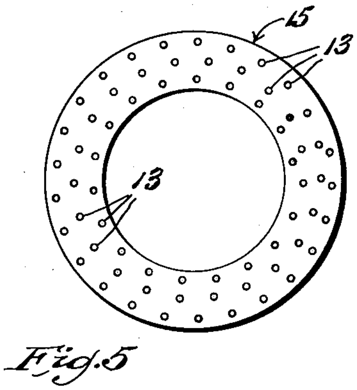
Fig. 5 is a face view of shielding and sealing gasket which has been cut away from the body of vulcanized base material.

If a shielding and sealing gasket of annular form is desired, a length of the base material 10—11 is wound lengthwise about a mandrel 12 of diameter corresponding to the internal diameter of the gasket to be produced (see Figs. 3 and 4). The lengthwise or endwise winding of the base material 10—11 around the mandrel 12 disposes the wales or longitudinally linked loops of the knit mesh 10 so that the same extend circumferentially around the mandrel in planes substantially parallel to the axis of the latter (see Fig. 3). The winding of the base material 10—11 about the mandrel 12 is continued until a sufficient number of convolute plies are superposed to build up the mass to an external diameter approximating the external diameter of the gasket to be produced (see Fig. 4). After the winding of the base material 10—11 is completed, the resultant mass, as deposited on the mandrel, is subjected to vulcanization in a mold or by means of any other suitable vulcanizing means, whereby to cure the rubber 11 and consolidate the plies of the mass into a unitary body. After the vulcanization process is completed, individual gasket bodies of desired thickness can be cut away from the vulcanized body. To this end, the vulcanized body is transversely sliced by cross cuts (as indicated for example by the broken lines in Fig. 3) whereby to cut away therefrom individual gaskets of desired thickness. The transverse cuts so made will be aligned with a longitudinal wale of the imbedded knit wire mesh 10, so as to pass through successive longitudinally linked loops of said mesh. It will be obvious that the linked loops imbedded in a gasket body 15 thus produced will, in the direction of their widths, lie in planes substantially perpendicular to the planes of the faces of said gasket body, and in extension between said faces (see Figs. 3 and 6), whereby opposite severed ends 13 of respective longitudinally linked loops 14 will be respectively exposed at the respective faces of the gasket body 15 (see Fig. 5). It will also be observed that, by the distribution of the loops 14 of the mesh 10 across the thickness and throughout the circumferential extent of the gasket body, a plurality of continuous electrically conductive loop-shaped strands or wires, which provide contact elements, will be disposed to extend uninterruptedly across the entire interior of said gasket from face to face thereof.

Figure 6:
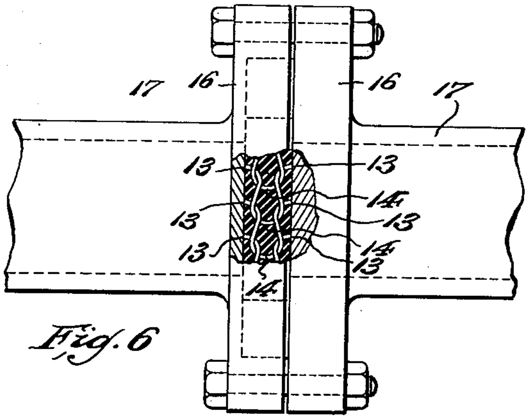
Fig. 6 is a fragmentary side elevational view of abutted shielding members with the gasket of Fig. 5 interposed therebetween.

When the gasket body 15 is disposed between abutting members of a shielding enclosure for electronic equipment, as e. g. between bolted together flanges 16 of joined metallic shielding conduits or shells 17 shown in Fig. 6, the exposed ends 13 of the loops 14 of the mesh which extend across the gasket body 15 will respectively contact the respective flanges 16, thus assuring a multiplicity of continuous electrically conductive contact elements bridging between the joined conduits or shells 17, while at the same time, due to the compressibility of the rubber or plastic constituent of the gasket body, said body can be tightly squeezed and compressed between said flanges 16, so as to assure a tight water and dust proof seal between the joined conduits or shells 17. By reason of the loop formation of the transverse bridging contact elements, the same will readily yield to compressional movement of the gasket body 15 without either risk of breakage or loss of contact with the flanges 16.

Figures 7, 8:
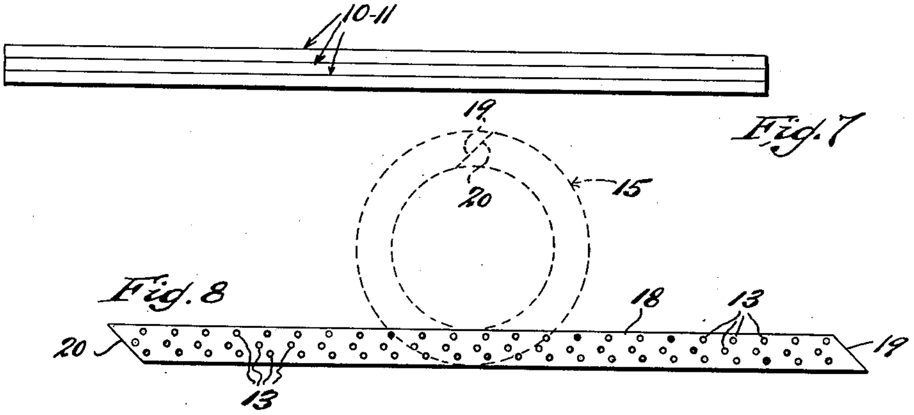
Fig. 7 is an edge elevational view of superposed layers or sheets of base material prepared for flat vulcanization.
Fig. 8 is an edge elevational view of a flat vulcanized body prepared for rolling and joining into a gasket formation.

Gaskets of annular or polygonal shape can be also produced by the following method. Sheets of the base material 10—11 may be superposed and stacked until a mass of desired height is obtained (see Fig. 7), and then said mass or stack can be vulcanized in its flat condition to consolidate the same into a unitary body. The body thus obtained is cut into strips 18 of desired thickness, the cuts extending longitudinally through wales of the imbedded mesh so as to expose ends 13 of the mesh loops at opposite cut faces of the strips (see Fig. 8). The strips can then be rolled endwise to abut their ends, and thus form an annular gasket body 15 (as indicated by broken lines in Fig. 8); the meeting ends thereof being then joined and secured together by a suitable adhesive, whereby to maintain the desired annular shape of the gasket. Preferably, the meeting ends of the strip are beveled as shown at 19 and 20 in Fig. 8. When the base material is worked in this manner, annular gasket bodies of any desired internal and external diametric sizes can be produced, without necessity for furnishing a variety of sizes of mandrels 12. It will be understood that the strips 18 can also be wrought into gasket bodies of selected polygonal shapes.

Figure 9:
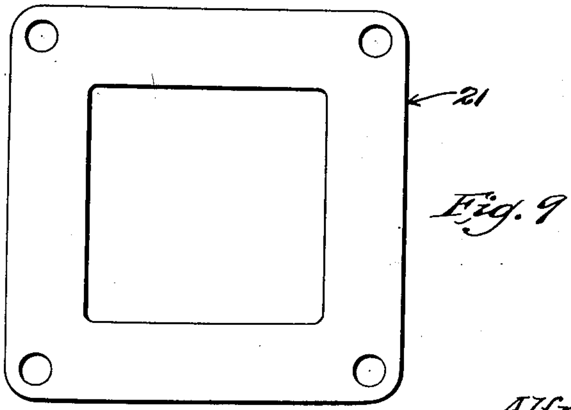
Fig. 9 is a face view of a flat gasket formation produced from the base material of Fig. 1.

It may here be pointed out that the base material 10—11, or superposed layers thereof consolidated by vulcanization, can be utilized to provide flat gasket formations 21 (such e. g. as shown in Fig. 9), wherein the mesh constituent extends in the plane of the gasket body. Gasket bodies of this type provide a very strong and durable sealing medium.

Having now described my invention, I claim:

1. A gasket for the purposes described comprising a body of resilient plastic substance having imbedded therein knitted metallic wire mesh, longitudinally linked loops of said mesh extending through said body substantially parallel to the body periphery, the mesh being cut along lines parallel to said longitudinally linked loops thereof with opposite cut ends of looped wires exposed respectively at opposite faces of the body, whereby said looped wires provide laterally yieldable, continuous electrically conductive contact elements extending transversely through the body from face to face thereof in planes substantially perpendicular to said faces.

2. A gasket for the purposes described comprising a body of resilient plastic substance, a plurality of radially spaced layers of knitted metallic wire mesh imbedded in said body, longitudinally linked loops of said mesh layers extending through said body substantially parallel to the body periphery, said mesh layers being cut along lines parallel to the longitudinal axes of longitudinally linked loops thereof with opposite cut ends of looped wires exposed respectively at opposite faces of the body, whereby said looped wires provide laterally yieldable, continuous electrically conductive contact elements extending transversely through the body from face to face thereof in planes substantially perpendicular to said faces.

3. A gasket for the purposes described comprising a body of vulcanized rubber having imbedded therein knitted metallic wire mesh, longitudinally linked loops of said mesh extending through said body substantially parallel to the body periphery, the mesh being cut along lines parallel to longitudinal axes of said longitudinally linked loops thereof with opposite cut ends of looped wires exposed respectively at opposite faces of the body, whereby said looped wires provide laterally yieldable, continuous electrically conductive contact elements extending transversely through the body from face to face thereof in planes substantially perpendicular to said faces.

4. A gasket for the purposes described comprising a body of vulcanized rubber, a plurality of radially spaced layers of knitted metallic wire mesh imbedded in said body, longitudinally linked loops of said mesh layers extending through said body substantially parallel to the body periphery, said mesh layers being cut along lines parallel to the longitudinal axes of longitudinally linked loops thereof with opposite cut ends of looped wires exposed respectively at opposite faces of the body, whereby said looped wires provide laterally yieldable, continuous electrically conductive contact elements extending transversely through the body from face to face thereof in planes substantially perpendicular to said faces.

5. A shielding and sealing gasket comprising an annular body of resilient plastic substance having imbedded therein at least one layer of knitted metallic wire mesh, longitudinally linked loops of said mesh extending circumferentially through said body, the mesh being cut along lines parallel to longitudinal axes of said longitudinally linked loops thereof with opposite cut ends of looped wires exposed respectively at opposite faces of the body, whereby said looped wires provide laterally yieldable, continuous electrically conductive contact elements extending transversely through the body from face to face thereof in planes substantially perpendicular to said faces.

6. A shielding and sealing gasket according to claim 5 wherein the body comprises vulcanized rubber.

7. A shielding and sealing gasket comprising an annular body of resilient plastic substance, a plurality of concentrically disposed and radially spaced layers of knitted metallic wire mesh imbedded in said body, longitudinally linked loops of said mesh layers extending circumferentially through said body, said mesh layers being cut along lines parallel to longitudinal axes of longitudinally linked loops thereof with opposite cut ends of looped wires exposed respectively at opposite faces of the body, whereby said looped wires provide a multiplicity of laterally yieldable, continuous electrically conductive contact elements extending transversely through the body from face to face thereof in planes substantially perpendicular to said faces.

8. A shielding and sealing gasket according to claim 7 wherein the body comprises vulcanized rubber.

References Cited in the file of this patent

UNITED STATES PATENTS

| Number | Name | Date |
|---|---|---|
| 2,240,358 | Walters | Apr. 29, 1941 |
| 2,477,267 | Robinson | July 26, 1949 |
| 2,533,976 | Teague | Dec. 12, 1950 |